(12) United States Patent
Onishi et al.

(10) Patent No.: US 6,282,034 B1
(45) Date of Patent: Aug. 28, 2001

(54) OPTICAL DEVICE AND FRESNEL LENS SHEET

(75) Inventors: Ikuo Onishi, Tsukuba; Ichiro Matsuzaki, Tokyo; Yoshihiro Kumagai, Nakajoh-machi, all of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/451,776

(22) Filed: Dec. 1, 1999

(30) Foreign Application Priority Data

Dec. 2, 1998 (JP) .................................................. 10-342795

(51) Int. Cl.$^7$ ....................................................... G02B 3/08
(52) U.S. Cl. ............................ 359/742; 359/456; 359/566
(58) Field of Search .................................... 359/742, 456, 359/457, 566, 621, 622, 623

(56) References Cited

U.S. PATENT DOCUMENTS 5,592,332 * 1/1997 Nishio et al. .......................... 359/619
6,013,664 * 2/2000 Goto ..................................... 359/456

* cited by examiner

*Primary Examiner*—Georgia Epps
*Assistant Examiner*—Timothy J Thompson
(74) *Attorney, Agent, or Firm*—Oblon, Spivak, McClelland, Maier & Neustadt, P.C.

(57) ABSTRACT

Provided is an optical device through which the angle of light passing and going out has little wavelength dependency and which is well applicable to Fresnel lenses with little coloration of light passing through it. The optical device has a diffraction grating formed on one surface and capable of diffracting rays of light incident thereon, and has a refracting member (e.g., a Fresnel lens) formed on the other surface opposite to the diffraction grating and capable of refracting the diffracted rays of light from the diffraction grating to make the refracted rays of light go out of it, in which the wavelength dependency of the diffractive angle of the main rays diffracted by the diffraction grating compensates for the wavelength dependency of the refractive angle thereof refracted by the refracting member, or that is, the former wavelength dependency is opposite to and cancels out the latter one.

14 Claims, 7 Drawing Sheets

7. FRESNEL LENS
5. FRESNEL LENS SHEET
6. DIFFRACTION GRATING

OPTICAL DEVICE AND FRESNEL LENS SHEET

BACKGROUND OF THE INVENTION

1. Field of the Invention

The present invention relates to an optical device and a Fresnel lens sheet comprising it.

2. Description of the Related Art

Figure 10:
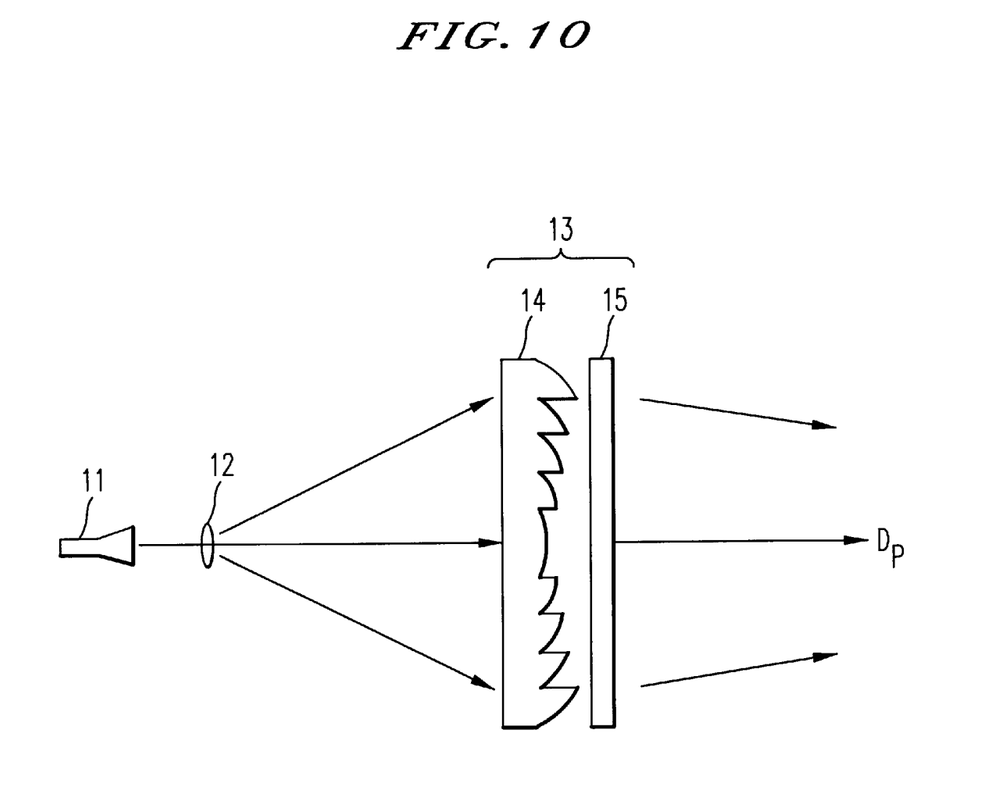
FIG. 10 is a view showing the outline of the constitution of a conventional rear projection display.

FIG. 10 is a schematic view showing the outline of the constitution of a conventional rear projection display. As illustrated, the conventional rear projection display comprises a projection tube 11 which projects an optical image, a projection lens 12 which magnifies the optical image from the projection tube 11, and a rear projection screen 13 which forms thereon the optical image having been magnified through the projection lens 12. A person P views the optical image having been projected, magnified and formed on the rear projection screen 13.

In many cases of the rear projection display of that type, the screen 13 has a two-sheet structure composed of a Fresnel lens sheet 14 which gathers the beams of light from the projection tube 11 toward the viewer, and a lenticular lens sheet 15 which disperses the light having passed through the Fresnel lens sheet 14 in the direction horizontal to the screen (that is, in the direction of the width of the screen) and in the direction vertical thereto (that is, in the direction of the height of the screen) at a predetermined angle in a suitable ratio to thereby enlarge the angle of visibility to be in a predetermined range.

In that type of rear projection display equipped with a rear projection screen, the projection lens 12 and the screen 13 are desired to be so disposed that the distance therebetween is shorter so as to reduce the thickness of the display. It is also desired to increase the luminance around the peripheral area of the screen. To meet the requirements, the Fresnel angle in the peripheral area of the Fresnel lens sheet 14 must be enlarged. On the other hand, in general, the refractive index of the material that forms the Fresnel lens surface of the Fresnel lens sheet has wavelength dependency. Therefore, the angle of light passing through the Fresnel lens shall vary, depending on the wavelength of the light. With the Fresnel angle increasing, the difference in the angle of light passing through the Fresnel lens shall increase, depending on the difference in the wavelength of the light. As a result, the light having reached the screen is colored to degrade the quality of the image formed on the screen. Accordingly, it is difficult to solve the problem with thinned rear projection displays only by enlarging the Fresnel angle in the peripheral area of the Fresnel lens sheet.

SUMMARY OF THE INVENTION

Given that situation, we, the present inventors have completed the present invention with its object to provide an optical device through which the angle of light passing and going out has little wavelength dependency and which is well applicable to Fresnel lenses with little coloration of light passing through it.

The optical device of the invention to solve the problem noted above has a diffraction grating formed on one surface and capable of diffracting rays of light incident thereon, and has a refracting member formed on the other surface opposite to the diffraction grating and capable of refracting the diffracted rays of light from the diffraction grating to make the refracted rays of light go out of it, in which the wavelength dependency of the diffractive angle of the main rays diffracted by the diffraction grating compensates for the wavelength dependency of the refractive angle thereof refracted by the refracting member, or that is, the former wavelength dependency is opposite to and cancels out the latter one. Other optical device of the invention to solve the problem noted above has a refracting member formed on one surface and capable of refracting rays of light incident thereon, and has a diffraction grating formed on the other surface opposite to the refracting member and capable of diffracting the refracted rays of light from the refracting member to make the diffracted rays of light go out of it, in which the wavelength dependency of the diffractive angle of the main rays diffracted by the diffraction grating compensates for the wavelength dependency of the refractive angle thereof refracted by the refracting member, or that is, the former wavelength dependency is opposite to and cancels out the latter one. In the optical devices, the refracting member may be of a Fresnel lens to give a Fresnel lens sheet.

In the invention, the diffraction grating may be formed on the refracting member. Specifically, the optical device of this embodiment of the invention has a refracting member formed on one surface and capable of refracting rays of light incident thereon to give refracted rays of light going out of it, and has a diffraction grating formed on the refracting member, in which the wavelength dependency of the diffractive angle of the main rays diffracted by the diffraction grating compensates for the wavelength dependency of the refractive angle thereof refracted by the refracting member. In the optical device of this embodiment, the refracting member may be also of a Fresnel lens to give a Fresnel lens sheet. In another embodiment of the invention, the diffraction grating and the refracting member of, for example, a Fresnel lens may be formed in different sheets. Specifically, in this embodiment, the diffraction grating sheet with a diffraction grating capable of diffracting rays of light incident thereon may be combined with the Fresnel lens sheet with a Fresnel lens capable of refracting the diffracted rays of light from the diffraction grating sheet to give refracted rays of light going out of it, in such a manner that the wavelength dependency of the diffractive angle of the main rays diffracted by the diffraction grating compensates for the wavelength dependency of the refractive angle thereof refracted by the Fresnel lens sheet.

As a rule, light is refracted through the interface between air and a substance, satisfying the following equation for which the refractive index of air is 1 (one):

$$\sin(\theta out) = n \cdot \sin(\theta in) \tag{1}$$

wherein θin indicates the angle of the light coming in the substance; θout indicates the angle of the light going out of the substance; and n indicates the refractive index of the material forming the substance.

The refractive indices nR, nG and nB of an ordinary Fresnel lens to red light (R), green light (G) and blue light (B), respectively, from a light source are generally in the following order:

$$nR < nG < nB \tag{2}$$

From the formula (1) above, therefore, the angles θR, θG and θB of the red light, the green light and the blue light, respectively, going out of the Fresnel lens shall be in the following order:

$$\theta R < \theta G < \theta B \tag{3}$$

Figure 9A:
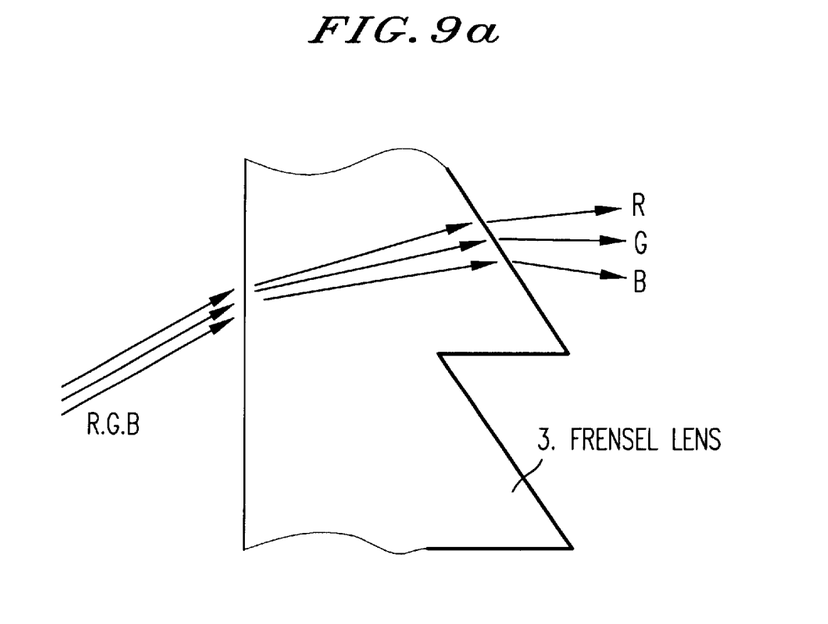
FIG. 9A and FIG. 9B are views for explaining the function of the Fresnel lens sheet of the invention.

Accordingly, as in FIG. 9A showing one model of an ordinary Fresnel lens, the angles of different rays of light going out of the Fresnel lens vary, depending on the wavelength of each ray. The wavelength dependency of rays of light passing through the Fresnel lens causes coloration of the projection screen combined with the Fresnel lens sheet and greatly degrades the quality of images formed on the screen.

As a rule, light passes through a diffraction grating, satisfying the following equation:

$$\sin(\theta out)=\sin(\theta in)+m\lambda/P \quad (4)$$

wherein P indicates the pitch of the diffraction grating; $\lambda$ indicates the wavelength of the light coming in the diffraction grating; $\theta in$ indicates the angle of the incoming light; $\theta out$ indicates the outgoing light; and m indicates the grading order of the diffraction grating.

In that condition, the wavelengths of the incoming red light, green light and blue light represented by $\lambda R$, $\lambda G$ and $\lambda B$, respectively, are in the following order:

$$\lambda R > \lambda G > \lambda B \quad (5).$$

Therefore, when m>0, $$\phi R > \phi G > \phi B \quad (6)$$

wherein $\phi R$, $\phi C$ and $\phi B$ indicate the diffractive angles of the red light, the green light and the blue light, respectively.

Figure 9B:
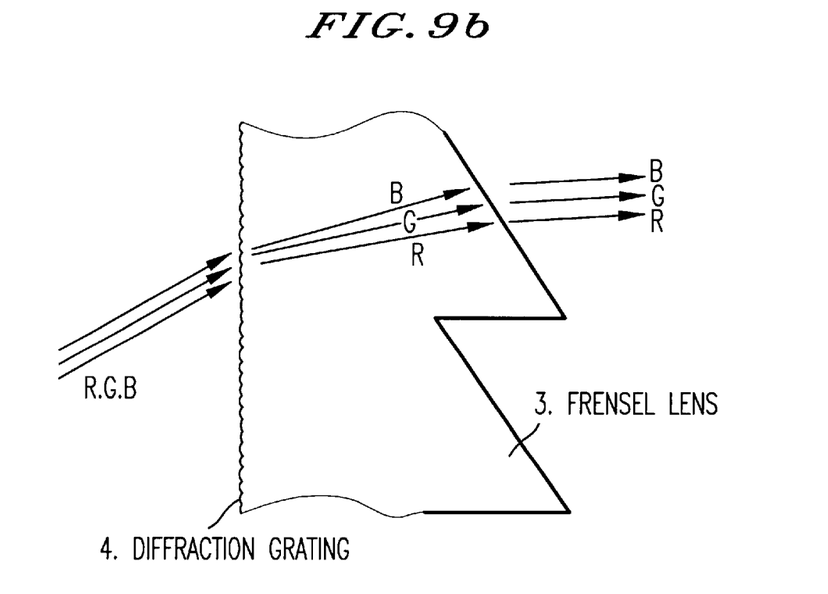

Accordingly, as in FIG. 9B where a diffraction grating is formed on one surface (back surface) of a device opposite to the Fresnel lens, the diffraction grating acts on the Fresnel lens in such a manner that the wavelength dependency of the diffractive angles of rays of light passing through the diffraction grating cancels out the wavelength dependency of the refractive angles of those rays of light passing through the Fresnel lens. Therefore, in the illustrated device, the wavelength dependency of the outgoing angles of rays of light going out of the Fresnel lens is thereby canceled to reduce the coloration of image-forming screens.

DESCRIPTION OF THE PREFERRED EMBODIMENTS

Figure 1:
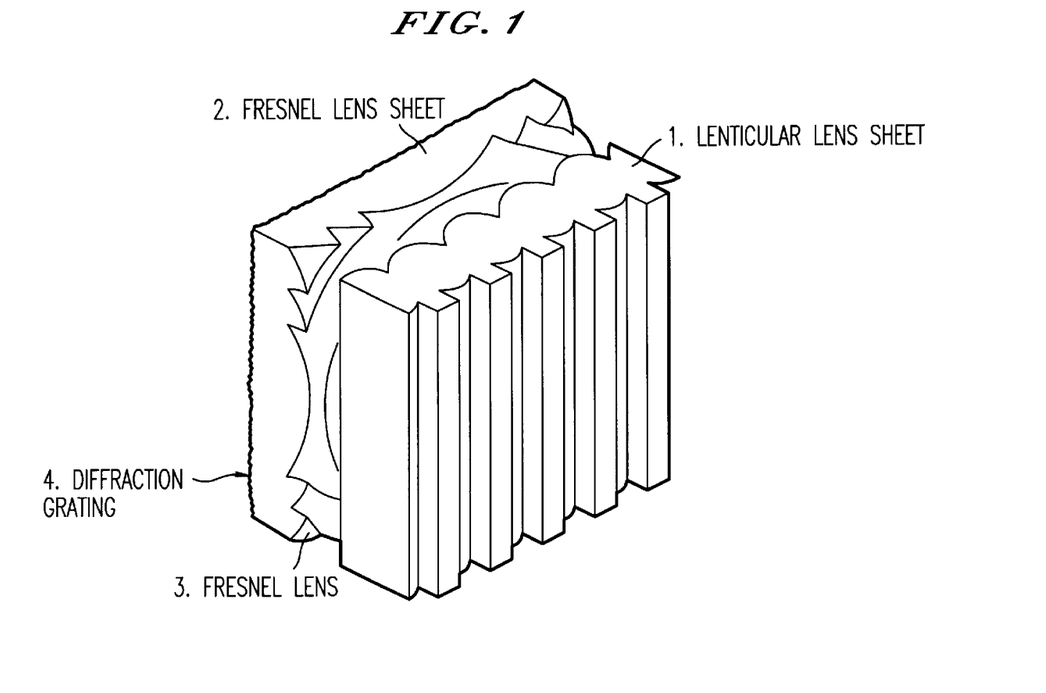
FIG. 1 is a perspective view showing the outline of one embodiment of a rear projection screen comprising the Fresnel lens sheet of the invention.

FIG. 1 is a perspective view showing the outline of a rear projection screen comprising the Fresnel lens sheet of the invention. In the rear projection screen illustrated, a lenticular lens sheet 1 is disposed on the side of a viewer, and a Fresnel lens sheet 2 is on the side of a projection tube (not shown). As in the perspective view of FIG. 2, a diffraction grating 4 is formed on the surface of the Fresnel lens sheet 2 facing a projection tube, while a Fresnel lens 3 is formed on the other surface thereof through which the light having entered it goes out. The diffraction grating may be formed concentrically with the Fresnel lens so that the center of the former could be the same as that of the latter, as so illustrated in FIG. 2. However, it is not always necessary to make the center of the diffraction grating the same as that of the Fresnel lens. If desired, the centers of the two may be shifted in some degree, depending on the intended light-collecting capabilities of them. Where the diffraction grating is formed concentrically with the Fresnel lens so that the center of the former could be the same as that of the latter, as in the illustrated case, the rays of light from a projection tube to enter the diffraction grating are so diffracted that they run in the direction of the center of the sheet. With that constitution, therefore, the rays of light having entered the sheet can be two-dimensionally collected through the sheet to thereby increase the luminance of the projection screen combined with the sheet. The Fresnel lens sheet may be produced, for example, by forming a diffraction grating on one surface of a transparent plastic sheet to be a substrate, through press molding, followed by forming a Fresnel lens of an ultraviolet-polymerization resin on the other surface thereof in a 2P process.

Figure 2:
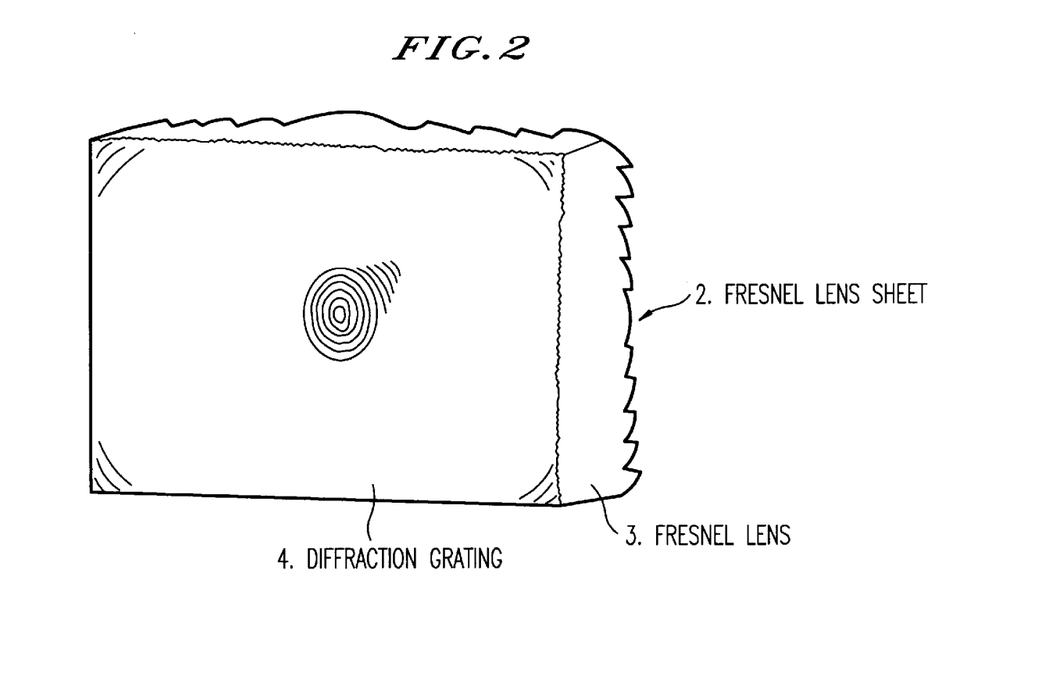
FIG. 2 is a perspective view showing the outline of one embodiment of the Fresnel lens sheet of the invention.

The Fresnel lens acts as a convex lens, and refracts the rays of light incident thereon, differently in its center area and peripheral area. In general, it diffracts the rays of light incident thereon, to a higher degree in its peripheral area than in its center area. Concretely, the configuration of the Fresnel lens is so defined that its rising height is larger in its peripheral area having a larger refractive angle than in the other area of the lens. With the Fresnel lens configuration of that type, it is desirable that the pitch of the diffraction grating is varied in the center area and the peripheral area of the Fresnel lens sheet. Since the rays of light incident on the lens sheet are refracted greatly through the sheet, the wavelength distribution of the rays of light having been refracted by the Fresnel lens in the sheet shall be larger in the peripheral area of the sheet than in the center area thereof. In that condition, the pitch of the diffraction grating is made shorter in the peripheral area in which the Fresnel lens has a larger refractive angle thereby making the wavelength dependency of the diffractive angle of the diffraction grating larger in that area so as to cancel out the wavelength distribution of the rays of light having been refracted by the Fresnel lens. When the pitch of the diffraction grating is made varied in the center area and the peripheral area of the Fresnel lens sheet, it is desirable that the varying pitch of the diffraction grating falls between 5 $\mu$m and 1000 $\mu$m. Within the defined range, the diffracting capabilities of the diffraction grating are not too much strong to give good images with no distortion, and are not too much weak to make the diffraction grating have the intended characteristics.

The peripheral area of the Fresnel lens sheet for rear projection screens receives the rays of light from a projection tube, in the direction oblique to the sheet. Therefore, the apparent grating height in the sheet shall be larger than the actual grating height therein. Accordingly, in order to unify the diffracting capabilities of the diffraction grating anywhere even in the center area and the peripheral area of the Fresnel lens sheet, the grating height in the peripheral area in which the refractive angle of the Fresnel lens is large must be smaller than in the center area. In this case, it is desirable that the grating height falls between 0.2 μm and 3 μm. If the grating height is smaller than 0.2 μm, the proportion of the diffracted rays of light will be too much small.

Figure 3:
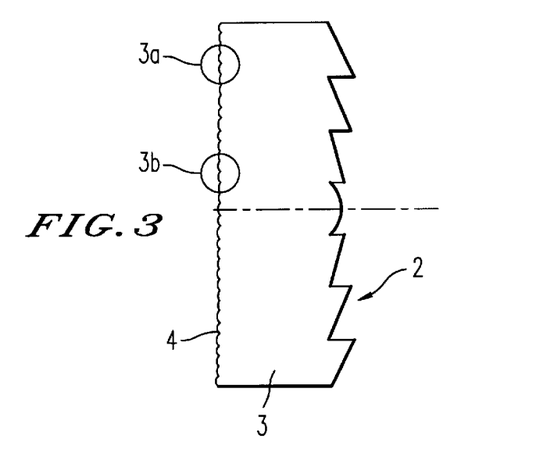
FIG. 3 is a view for explaining the grating pitch and the grating height in the Fresnel lens sheet of the invention.
Figure 3A:
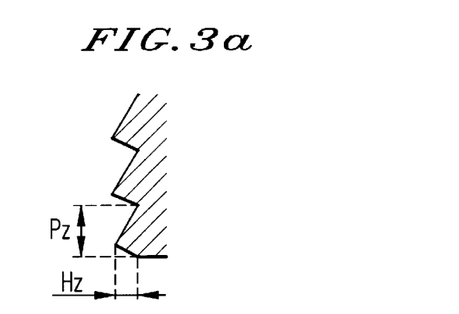
Figure 3B:
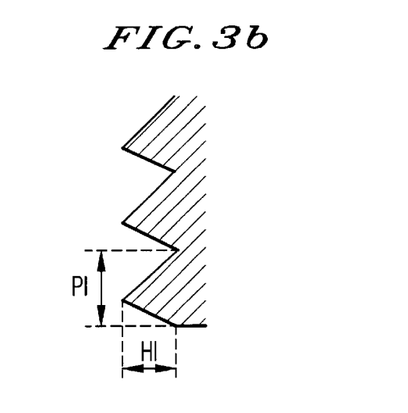

FIG. 3 is a cross-sectional view schematically showing the Fresnel lens sheet of the invention, in which the Fresnel angle of the Fresnel lens and also the grating pitch and the grating height of the diffraction grating are varied depending on the distance from the center of the Fresnel lens. In FIG. 3, P1 and H1 each indicate the grating pitch and the grating height, respectively, in the center area of the Fresnel lens sheet; and P2 and H2 each indicate the grating pitch and the grating height, respectively, in the peripheral area thereof. The Fresnel lens sheet of FIG. 3 shall be in the following conditions, as is understood from FIG. 4A and FIG. 4B.

H2<H1, and

Figure 4A:
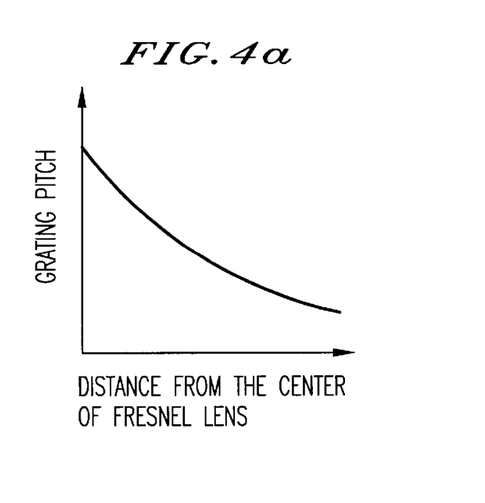
FIG. 4A and FIG. 4B are graphs each showing one embodiment of the grating pitch and the grating height, respectively, in the Fresnel lens sheet of the invention.
Figure 4B:
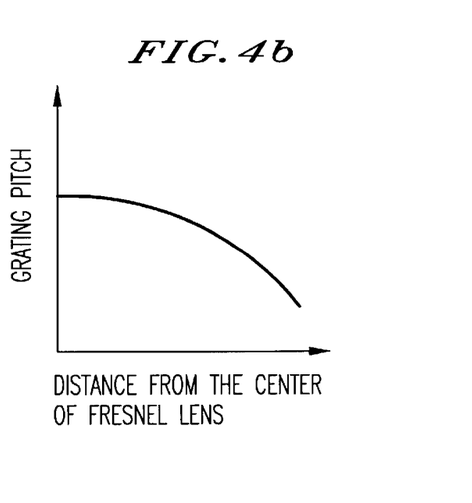

P2<P1.

Some examples of the Fresnel lens sheet of the invention are shown in Table 1 below, in which the Fresnel angle of the Fresnel lens and also the grating pitch and the grating height of the diffraction grating are varied depending on the distance from the center of the Fresnel lens. These are produced by laminating a 2P resin (thickness: 0.15 mm) on a substrate (thickness: 1.85 mm). The refractive indices of the 2P resin and the substrate to different wavelengths of red, green and blue light are shown in Table 2 below.

TABLE 1

| Radius (mm) | Fresnel Angle (deg.) | Grating Pitch (μm) | Grating Height (μm) |
|---|---|---|---|
| 100 | 14.2 | 34.7 | 0.99 |
| 200 | 26.8 | 25.8 | 0.97 |
| 300 | 37.0 | 19.2 | 0.94 |
| 400 | 44.9 | 14.4 | 0.89 |
| 500 | 51.0 | 11.2 | 0.85 |
| 600 | 55.8 | 9.1 | 0.80 |

TABLE 2

| Constituent Components | Material | Substrate Acryl-Styrene Copolymer | 2P Resin Photo-polymerization Acrylic Resin |
|---|---|---|---|
| Refractive Index | wavelength: 470 nm | 1.545 | 1.558 |
| | wavelength: 550 nm | 1.537 | 1.552 |
| | wavelength: 610 nm | 1.532 | 1.549 |

Figure 5:
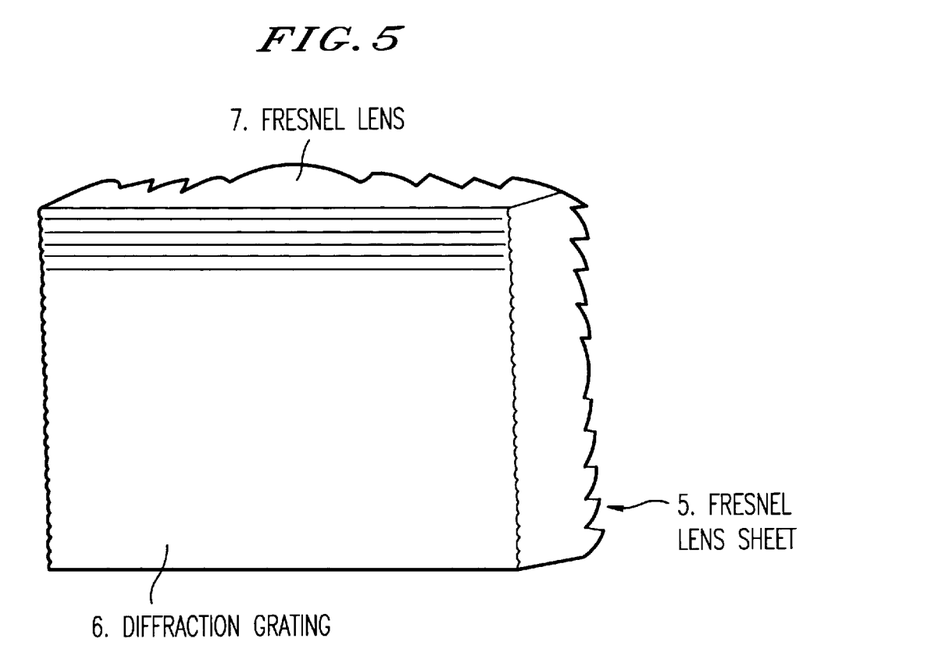
FIG. 5 is a perspective view showing the outline of another embodiment of the Fresnel lens sheet of the invention.
Figure 6:
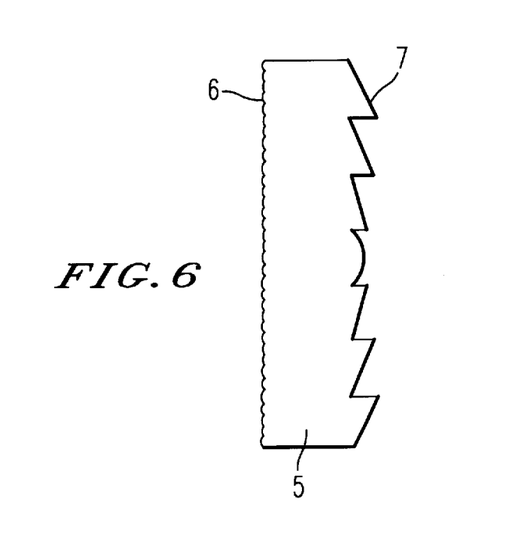
FIG. 6 is a cross-sectional view of the Fresnel lens sheet of FIG. 5.

Another embodiment of the Fresnel lens sheet of the invention is in FIG. 5 schematically showing the perspective view of the sheet. As illustrated, the Fresnel lens sheet 5 has a diffraction grating 6 formed on one surface opposite to the other surface on which is formed a Fresnel lens 7. In this, the grating is in the horizontal direction of the sheet. FIG. 6 is a cross-sectional view of the Fresnel lens sheet of FIG. 5. In the Fresnel lens sheet of this embodiment, the diffraction grating 6 diffract the rays of light having entered it, in the direction perpendicular to the sheet. With this, therefore, the Fresnel lens sheet could additionally have the action of a lenticular lens sheet, and could reduce the coloration of even the peripheral area of the screen combined with it. Even in this embodiment where the diffraction grating is formed in the horizontal direction of the sheet, the grating pitch and the grating height may be varied depending on the varying refractive indices of the Fresnel lens.

Figure 7:
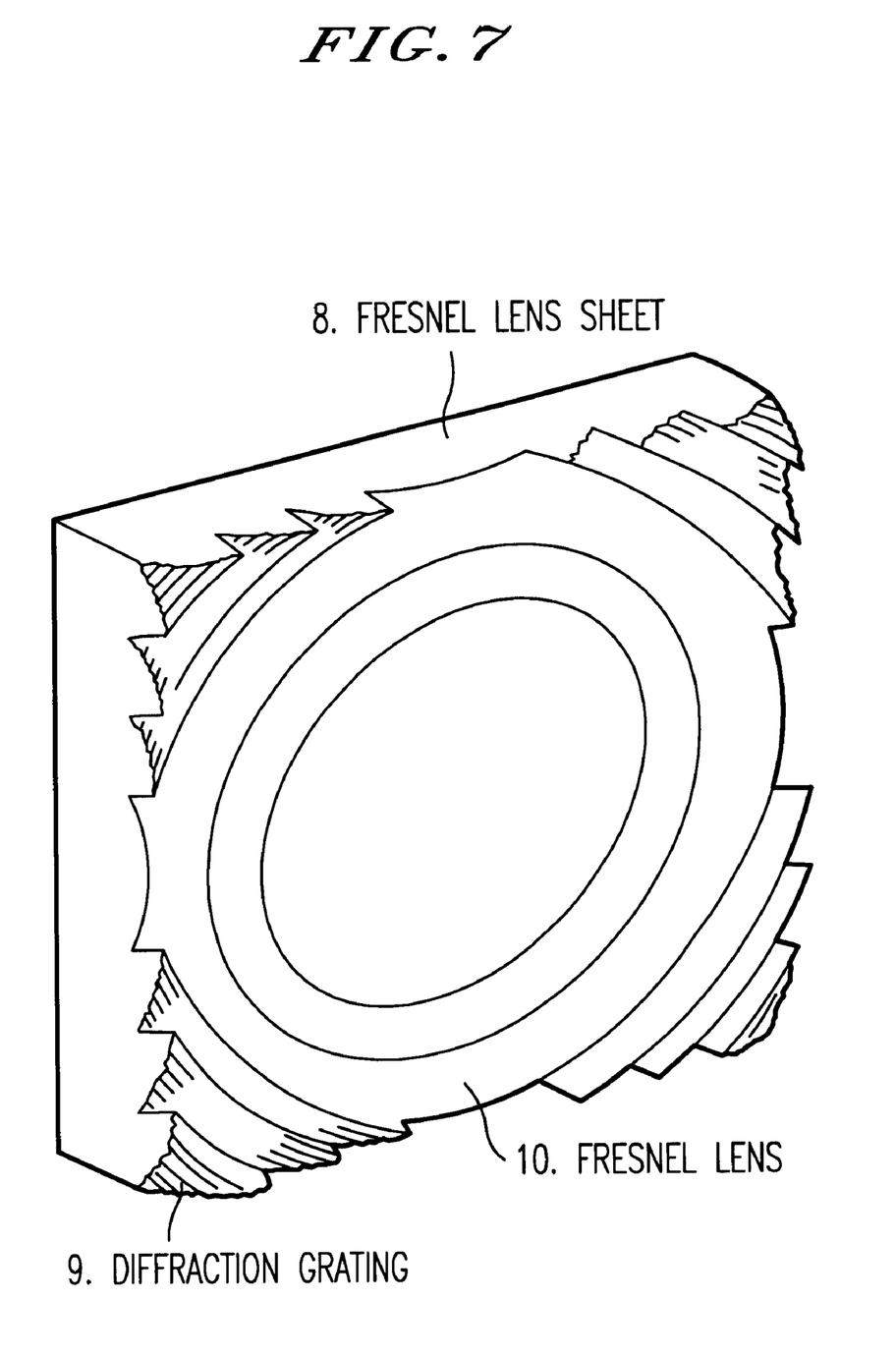
FIG. 7 is a perspective view showing the outline of still another embodiment of the Fresnel lens sheet of the invention.
Figure 8:
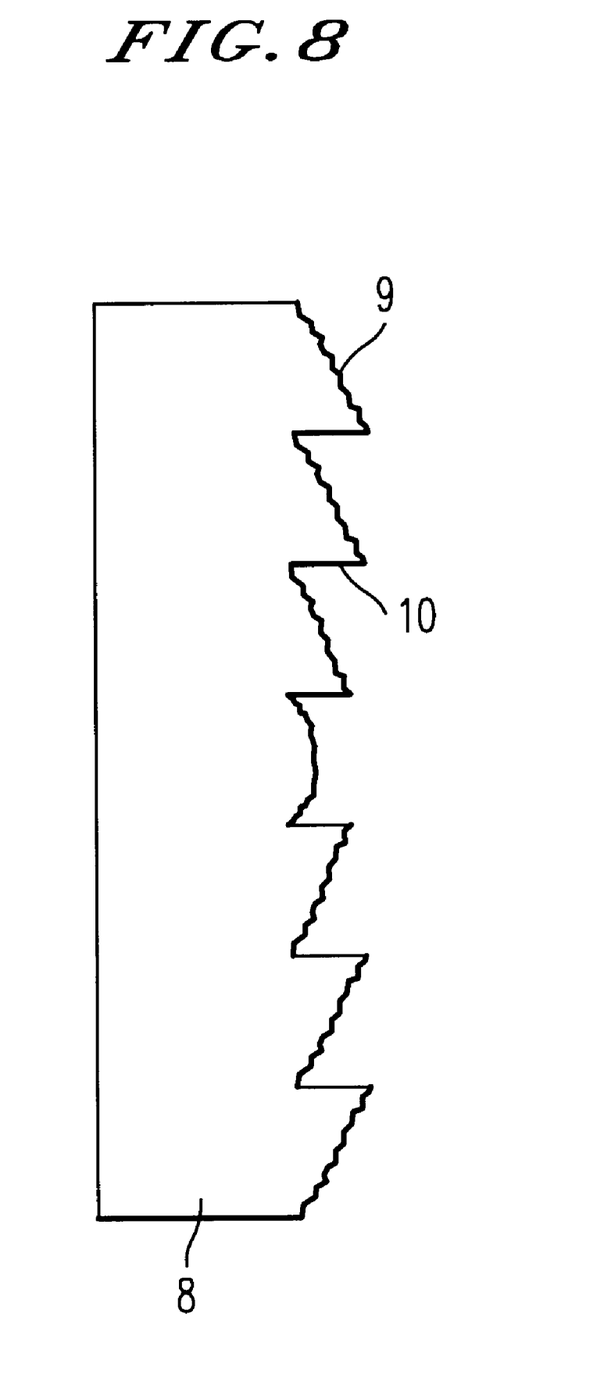
FIG. 8 is a cross-sectional view of the Fresnel lens sheet of FIG. 7.

Still another embodiment of the Fresnel lens sheet of the invention is in FIG. 7 schematically showing the perspective view of the sheet. As illustrated, the Fresnel lens sheet 8 has a diffraction grating 9 formed on the surface of the Fresnel lens 10 of the sheet. FIG. 8 is a cross-sectional view of the Fresnel lens sheet of FIG. 7. The Fresnel lens sheet having the configuration illustrated may be produced in a 2P process utilizing a mold for a Fresnel lens sheet with a diffraction grating pattern on its surface to give the surface of the Fresnel lens. The Fresnel lens sheet having the configuration of that type does not require different steps of separately working the both surfaces of the Fresnel lens sheet in different ways, and its producibility is high.

As a rule, the rays of light having passed through a diffraction grating go out of it, at scattering angles to be determined by the number of diffraction orders. Where the rays of light having entered a diffraction grating go out of it in a large number of diffraction orders, the diffracted rays are dispersed to lower the luminance from them. Where the diffracted rays of light are concentrated to a specific order, such as those of the primary order, the luminance relative to the outgoing angle of the diffracted rays of light that shall be determined by the diffraction order could be increased. In this case, the cross section of the diffraction grating may have a profile of saw teeth. Utilizing diffracted rays of light falling within a range of different diffraction orders (for example, from primary to pentanary orders) makes it possible to view a screen in different directions. In this case, the cross section of the diffraction grating may have different profiles of sine curves, triangles, rectangles, etc. When the diffraction grating is so configured that the sum of the intensity of the primary-order diffracted rays and that of the zero-order diffracted rays from it is not smaller than 40% of the total intensity of all diffracted rays including secondary and other higher order rays, it could effectively utilize the light incident thereon to increase the luminance from it.

Where the Fresnel lens sheet of the invention is applied to a rear projection screen, it may be combined with an ordinary lenticular lens sheet, for example, as in FIG. 10. If desired, a protective front sheet may be attached to the viewer s side of the lenticular lens sheet.

As described in detail hereinabove, the optical device of the invention has the advantage of little wavelength dependency of the angle of light passing through and going out of it, and is well applicable to Fresnel lenses with little coloration of light passing through it.

While the invention has been described in detail and with reference to specific embodiments thereof, it will be apparent to one skilled in the art that various changes and modifications can be made therein without departing from the spirit and scope thereof.

What is claimed is:

1. An optical device having a diffraction grating formed on one surface and capable of diffracting rays of light incident thereon, and having a refracting member formed on the other surface opposite to the diffraction grating and capable of refracting the diffracted rays of light from the diffraction grating to make the refracted rays of light go out of it, in which the wavelength dependency of the diffractive angle of the main rays diffracted by said diffraction grating compensates for the wavelength dependency of the refractive angle thereof refracted by said refracting member.

2. An optical device having a refracting member formed on one surface and capable of refracting rays of light incident thereon, and having a diffraction grating formed on the other surface opposite to the refracting member and capable of diffracting the refracted rays of light from the refracting member to make the diffracted rays of light go out of it, in which the wavelength dependency of the diffractive angle of the main rays diffracted by said diffraction grating compensates for the wavelength dependency of the refractive angle thereof refracted by said refracting member.

3. An optical device having a refracting member formed on one surface and capable of refracting rays of light incident thereon to give refracted rays of light going out of it, and having a diffraction grating formed on said refracting member, in which the wavelength dependency of the diffractive angle of the main rays diffracted by said diffraction grating compensates for the wavelength dependency of the refractive angle thereof refracted by said refracting member.

4. A Fresnel lens sheet having a diffraction grating formed on one surface and capable of diffracting rays of light incident thereon, and having a Fresnel lens formed on the other surface opposite to the diffraction grating and capable of refracting the diffracted rays of light from the diffraction grating to make the refracted rays of light go out of it, in which the wavelength dependency of the diffractive angle of the main rays diffracted by said diffraction grating compensates for the wavelength dependency of the refractive angle thereof refracted by said Fresnel lens.

5. A Fresnel lens sheet having a Fresnel lens formed on one surface and capable of refracting rays of light incident thereon, and having a diffraction grating formed on the other surface opposite to the Fresnel lens and capable of diffracting the refracted rays of light from the Fresnel lens to make the diffracted rays of light go out of it, in which the wavelength dependency of the diffractive angle of the main rays diffracted by said diffraction grating compensates for the wavelength dependency of the refractive angle thereof refracted by said Fresnel lens.

6. A Fresnel lens sheet having a Fresnel lens formed on one surface and capable of refracting rays of light incident thereon to give refracted rays of light going out of it, and having a diffraction grating formed on said Fresnel lens, in which the wavelength dependency of the diffractive angle of the main rays diffracted by said diffraction grating compensates for the wavelength dependency of the refractive angle thereof refracted by said Fresnel lens.

7. The Fresnel lens sheet as claimed in any one of claims 4 to 6, wherein the diffraction grating is so configured that its pitch is shorter with the increase in the refractive angle of the Fresnel lens.

8. The Fresnel lens sheet as claimed in claim 7, wherein the diffraction grating pitch falls between 5 $\mu$m and 1000 $\mu$m.

9. The Fresnel lens sheet as claimed in any one of claims 4 to 8, wherein the diffraction grating is so configured that its height is smaller with the increase in the refractive angle of the Fresnel lens.

10. The Fresnel lens sheet as claimed in claim 9, wherein the diffraction grating height falls between 0.2 $\mu$m and 3 $\mu$m.

11. The Fresnel lens sheet as claimed in any one of claims 4 to 10, wherein the diffraction grating is patterned in the concentric direction.

12. The Fresnel lens sheet as claimed in any one of claims 4 to 10, wherein the diffraction grating is patterned in the linear direction.

13. The Fresnel lens sheet as claimed in any one of claims 4 to 12, wherein the diffraction grating is so configured that the sum of the intensity of the primary-order diffracted rays and that of the zero-order diffracted rays from it is not smaller than 40% of the total intensity of all diffracted rays including secondary and other higher order rays.

14. A Fresnel lens sheet to be combined with a sheet having a diffraction grating formed on it and capable of diffracting rays of light incident thereon, the Fresnel lens sheet being characterized in that it has a Fresnel lens formed on it and capable of refracting the diffracted rays of light from the diffraction grating to make the refracted rays of light go out of it, and that the wavelength dependency of the diffractive angle of the main rays diffracted by said diffraction grating compensates for the wavelength dependency of the refractive angle thereof refracted by said Fresnel lens.

* * * * *